United States Patent
Kim et al.

(10) Patent No.: US 10,096,085 B2
(45) Date of Patent: Oct. 9, 2018

(54) METHOD FOR GENERATING IMAGES FOR MULTI-PROJECTION THEATER AND IMAGE MANAGEMENT APPARATUS USING THE SAME

(71) Applicant: CJ CGV CO., LTD., Seoul (KR)

(72) Inventors: Hwan Chul Kim, Seoul (KR); Su Ryeon Kang, Goyang-si (KR); Jihyung Kang, Hwaseong-si (KR)

(73) Assignee: CJ CGV CO., LTD., Seoul (KR)

( * ) Notice: Subject to any disclaimer, the term of this patent is extended or adjusted under 35 U.S.C. 154(b) by 10 days.

(21) Appl. No.: 14/560,907

(22) Filed: Dec. 4, 2014

(65) Prior Publication Data

US 2015/0163447 A1    Jun. 11, 2015

(30) Foreign Application Priority Data

Dec. 9, 2013  (KR) .................. 10-2013-0152582

(51) Int. Cl.
*G06T 3/00*  (2006.01)
*H04N 9/31*  (2006.01)

(52) U.S. Cl.
CPC ........... *G06T 3/005* (2013.01); *H04N 9/3147* (2013.01); *H04N 9/3185* (2013.01)

(58) Field of Classification Search
None
See application file for complete search history.

(56) References Cited

U.S. PATENT DOCUMENTS

| | | | |
|---|---|---|---|
| 6,570,555 B1 * | 5/2003 | Prevost | G06F 3/038 345/156 |
| 6,781,598 B1 * | 8/2004 | Yamamoto | G06T 15/20 345/420 |
| 6,937,210 B1 | 8/2005 | MacDonald | |
| 7,382,399 B1 | 6/2008 | McCall et al. | |
| 2003/0117675 A1 * | 6/2003 | Shirato | G06T 5/006 358/505 |
| 2007/0103546 A1 | 5/2007 | Collender et al. | |

FOREIGN PATENT DOCUMENTS

| | | |
|---|---|---|
| CN | 101292282 A | 10/2008 |
| JP | 04-063092 A | 2/1992 |
| JP | 08-241268 A | 8/1996 |
| JP | 2002203237 | 7/2002 |

(Continued)

OTHER PUBLICATIONS

International Search Report for PCT/KR2014/011861 dated Feb. 9, 2015.

(Continued)

*Primary Examiner* — Said Broome
(74) *Attorney, Agent, or Firm* — Hauptman Ham, LLP

(57) ABSTRACT

Disclosed herein is a method of generating images for a multi-projection theater and a method of generating projection images for a multi-projection theater, wherein a source image is mapped to a sphere, virtual planes according to the structure of a multi-projection theater are generated, and the source image on the sphere is projected on the virtual planes. The method may include mapping a source image to a sphere, generating a virtual plane according to the structure of a theater, and projecting the image on the sphere on the virtual plane.

10 Claims, 10 Drawing Sheets

(56)     References Cited

FOREIGN PATENT DOCUMENTS

| | | | |
|---|---|---|---|
| JP | 2002-350999 | A | 12/2002 |
| JP | 2005277825 | A | 10/2005 |
| JP | 2005-347813 | A | 12/2005 |
| JP | 2009-015730 | A | 1/2009 |
| JP | 2009217019 | A | 9/2009 |
| JP | 2012-095195 | A | 5/2012 |
| JP | 2013247591 | A | 12/2013 |
| KR | 1020110116325 | A | 10/2011 |
| KR | 101305249 | B1 | 9/2013 |
| WO | 2013102398 | A1 | 7/2013 |

OTHER PUBLICATIONS

Korean Office Action dated Jun. 30, 2016 for corresponding Korean Application No. 10-2013-0152582.
Brandon Lloyd, "Advanced Texture Mapping", http://www.cs.unc.edu/~blloyd/comp770/Lecture12.pdf, Computer Graphic, COMP 770 (236), Feb. 21, 2007, 44 pages.
Korean Office Action dated Jan. 31, 2017 in connection with the counterpart Korean Patent Application No. 10-2013-0152582.
Chinese Office Action dated Apr. 19, 2017 in connection with the counterpart Chinese Patent Application No. 201410748839.3.
Japanese Office Action dated Jun. 27, 2017 in connection with the counterpart Japanese Patent Application No. 2016-537966.

* cited by examiner (Reference point=center of sphere)

- $Ax : Az = Bx : Bz$ $Bx = \left(\dfrac{Ax}{Az}\right) \cdot Bz$  ( $Bz$ : Constant at all points on same virtual plane )

$= (\tan \alpha) \cdot Bz$

- Likewise, $By = \left(\dfrac{Ay}{Az}\right) \cdot Bz$ $= (\tan \beta) \cdot Bz$

- $Bx = \left(\dfrac{Ax}{Az}\right) \cdot Bz = (\cot \alpha) \cdot Bz$

- $By = \left(\dfrac{Ay}{Az}\right) \cdot Bz = (\tan \beta) \cdot Bz$

- $Bx = \left(\dfrac{Ax}{Az}\right) \cdot Bz$
  $= \tan(180-(\alpha+\kappa)) \cdot Bz$

- $By = \left(\dfrac{Ay}{Az}\right) \cdot Bz$
  $= (\tan \beta) \cdot Bz$

METHOD FOR GENERATING IMAGES FOR MULTI-PROJECTION THEATER AND IMAGE MANAGEMENT APPARATUS USING THE SAME

CROSS REFERENCE TO RELATED APPLICATION

The present application claims the benefit of Korean Patent Application No. 10-2013-0152582 filed in the Korean Intellectual Property Office on Dec. 9, 2013, the entire contents of which are incorporated herein by reference.

BACKGROUND OF THE INVENTION

1. Technical Field

The present invention relates to a method of generating images for a multi-projection theater and, more particularly, to a method of generating projection images for a multi-projection theater, wherein a source image is mapped to a sphere, virtual planes according to the structure of a multi-projection theater are generated, and the source image on the sphere is projected on the virtual planes.

2. Description of the Related Art

In order to provide audiences with a new three-dimensional effect and immersive experience, a so-called "multi-projection system" different from a known screening system based on a single screen is proposed.

The "multi-projection system" is a technology in which a plurality of projection surfaces is disposed on the periphery of stands (e.g., the front, the left, the right, the ceiling, and the bottom) and an image having a three-dimensional effect and immersive experience can be provided to audiences although a 3D technology is not applied to the image itself.

Such a multi-projection system may be constructed in different structures depending on the conditions of theaters because a plurality of projection surfaces is disposed in various directions around stands. More specifically, a plurality of projection surfaces disposed in each theater may have different disposition angles, different areas, etc. depending on the conditions of each theater. Accordingly, it is essential to taken into consideration the structural characteristics of each theater in a process of generating projection images (i.e., images projected on a plurality of projection surfaces) for such a multi-projection system.

However, there is no prior art capable of generating projection images by taking the structure of a theater into consideration. The reason for this is that a need to generate projection images by taking into consideration the structural characteristics of a theater is low because a conventional theater includes only a single projection surface disposed at the front as described above.

Accordingly, there is a need for a technology capable of generating projection images for a theater by taking into consideration the structural characteristics of the theater.

The present invention has been invented based on such a technical background and also has been invented to satisfy the aforementioned technical needs and to provide additional technical elements that may not be easily invented by those skilled in the art to which the present invention pertains. Accordingly, the present invention should not be construed as being limited by the technical background.

SUMMARY OF THE INVENTION

Accordingly, the present invention has been made keeping in mind the above problems occurring in the prior art, and an object of the present invention is to generate projection images by taking the structural characteristics of a theater into inconsideration.

Another object of the present invention is to generate images to be projected on a multi-projection theater by taking into consideration the structural characteristics of a plurality of projection surfaces disposed in the multi-projection theater.

Technical objects to be achieved by the present invention are not limited to the aforementioned objects, and the technical objects may include various technical objects within a range that is evident to those skilled in the art from the following description.

A method of generating an image in accordance with an embodiment of the present invention includes (a) mapping a source image to a sphere, (b) generating a virtual plane according to a structure of a theater, and (c) projecting the image on the sphere on the virtual plane.

Furthermore, in the method of generating an image in accordance with an embodiment of the present invention, the theater may be a multi-projection theater including a plurality of projection surfaces. At step (b), a plurality of the virtual planes corresponding to the plurality of projection surfaces may be generated.

Furthermore, in the method of generating an image in accordance with an embodiment of the present invention, at step (c), the image on the sphere may be projected on the plurality of virtual planes, and a plurality of projection images to be projected on the plurality of projection surfaces may be generated based on a projection operation.

Furthermore, in the method of generating an image in accordance with an embodiment of the present invention, the source image may include a pixel represented on a coordinate system using a horizontal angle value and a vertical angle value as parameters.

Furthermore, in the method of generating an image in accordance with an embodiment of the present invention, the pixel may have the horizontal angle value belonging to a range of −180 degrees to 180 degrees and the vertical angle value belonging to a range of −90 degrees to 90 degrees.

Furthermore, in the method of generating an image in accordance with an embodiment of the present invention, at step (b), the virtual plane may be generated based on a reference point of the theater. At step (c), the projection may be performed in the state in which the reference point has been matched with a center of the sphere.

Furthermore, in the method of generating an image in accordance with an embodiment of the present invention, at step (c), a location on the virtual plane on which a pixel of the sphere is projected may be computed based on information about the 3D location or angle of the pixel for the center of the sphere.

Such a method of generating an image in accordance with an embodiment of the present invention may be programmed and then stored in a recording medium that may be recognized by an electronic device.

An image management apparatus in accordance with an embodiment of the present invention includes an image generation unit configured to map a source image to a sphere, generate a virtual plane according to a structure of a theater, and generate a projection image by projecting the image on the sphere on the virtual plane.

Furthermore, in the image management apparatus in accordance with an embodiment of the present invention, the theater may be a multi-projection theater including a plurality of projection surfaces, and the image generation unit may generate a plurality of the virtual planes corresponding to the plurality of projection surfaces.

Furthermore, in the image management apparatus in accordance with an embodiment of the present invention, the image generation unit may project the image on the sphere on the plurality of virtual planes and generate a plurality of projection images to be projected on the plurality of projection surfaces based on a projection operation.

Furthermore, in the image management apparatus in accordance with an embodiment of the present invention, the image generation unit may generate the virtual plane based on a reference point of the theater and perform the projection in the state in which the reference point has been matched with the center of the sphere.

Furthermore, in accordance with an embodiment of the present invention, the image generation unit may computes a location on the virtual plane on which a pixel of the sphere is projected based on information about the 3D location or angle of the pixel for the center of the sphere.

Furthermore, the image management apparatus in accordance with an embodiment of the present invention may further include a database unit configured to store the structural data of the theater, and the image generation unit generates the virtual plane using the structural data.

Furthermore, the image management apparatus in accordance with an embodiment of the present invention may further include a communication unit configured to send data to a plurality of theaters. The image generation unit may generate virtual planes for the respective theaters, generally generate images to be projected on the respective theaters, and send the generated images to the theaters using the communication unit.

DETAILED DESCRIPTION

Figure 1:
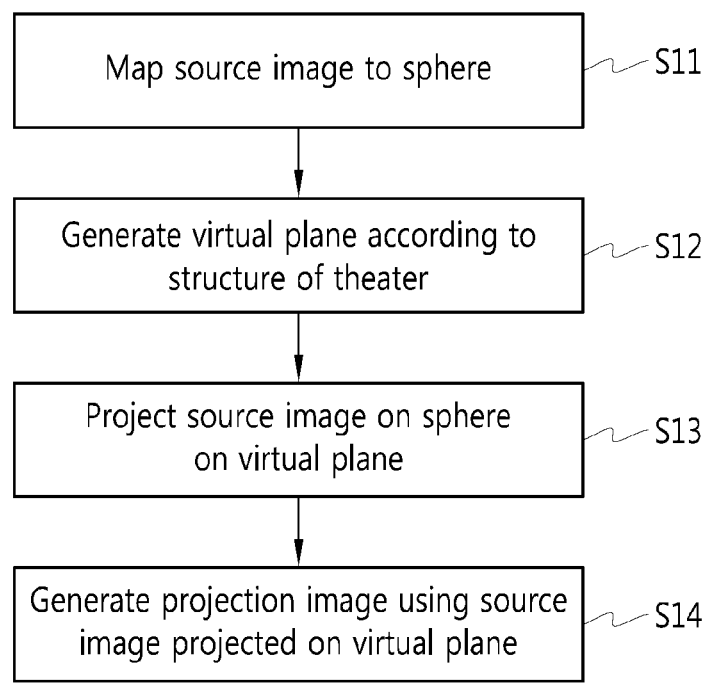
FIG. 1 is a flowchart illustrating a method of generating an image in accordance with an embodiment of the present invention.

Hereinafter, a method of generating images for a multi-projection theater and an image management apparatus using the same in accordance with embodiments of the present invention are described in detail with reference to the accompanying drawings. The embodiments to be described are provided in order for those skilled in the art to easily understand the technical spirit of the present invention, and the present invention is not limited to the embodiments. Furthermore, contents represented in the accompanying drawings have been diagrammed in order to easily describe the embodiments of the present invention, and the contents may be different from forms that are actually implemented.

Each of the elements represented herein is only an example for implementing the embodiments of the present invention. Accordingly, in other implementations of the present invention, different elements may be used without departing from the spirit and scope of the present invention. Furthermore, each element may be purely formed of a hardware or software element, but may also be implemented using a combination of various hardware and software elements that perform the same function.

Furthermore, an expression that some elements are "included" is an expression of an "open type", and the expression simply denotes that the corresponding elements are present, but it should not be understood that additional elements are excluded.

Furthermore, terms including ordinal numbers, such as the first and the second, may be used to describe various constituent elements, but the terms are used to only "distinguish" one constituent element from the constituent other element. The attributes of the constituent elements are not limited by the terms.

Furthermore, a method of generating an image to be described later in accordance with an embodiment of the present invention preferably may be used to generate an image for a theater in which a multi-projection system has been constructed, but is not limited to such a use. That is, the method of generating an image in accordance with an embodiment of the present invention may be used in a known theater in which a plurality of projection surfaces has not been installed (e.g., a theater including only a single projection surface at the front) and may also be used in various theaters.

For reference, a "multi-projection system" described in this specification means a screening system including a plurality of projection surfaces. More specifically, the multi-projection system means a system in which a plurality of projection surfaces (e.g., the projection surfaces may be implemented in various forms, such as a screen, the surface of a wall, and the surface of an installation) is disposed on the periphery of stands and a screening environment having a three-dimensional effect and a high immersive experience is provided to audiences by projecting an image on the plurality of projection surfaces.

In this case, the plurality of projection surfaces may be implemented in various forms, such as a screen, the surface of a wall, the bottom, the ceiling, and the surface of an installation). Accordingly, the multi-projection system may be implemented in various forms, for example, 1) a system that uses a screen at the front, the surface of a wall on the left, and the surface of a wall on the right as projection surfaces, 2) a system that uses a screen at the front, the surface of a wall on the left, the surface of a wall on the right, and the surface of the bottom as projection surfaces, and 3) a system that uses the surface of a wall at the front, the surface of a wall on the left, the surface of a wall on the right, the surface of the bottom, and the surface of the ceiling as projection surfaces. In this case, the introduced systems are only illustrative, and the multi-projection system may be implemented in various forms using various projection surfaces.

Furthermore, a "multi-projection theater" described in this specification means a theater in which the multi-projection system has been constructed.

Furthermore, the "method of generating an image" to be described later in accordance with an embodiment of the present invention preferably may be used to generally manage an image for a plurality of theaters, but may also be used in a process of managing an image for a single theater.

Furthermore, the method of generating an image to be described later in accordance with an embodiment of the present invention may be implemented through a cooperation operation between various types of hardware and software. For example, the method of generating an image in accordance with an embodiment of the present invention may be implemented through a calculation operation executed by one or more server apparatuses and may also be implemented through a cooperation operation between one or more server apparatuses and various electronic devices.

Furthermore, the method of generating an image in accordance with an embodiment of the present invention may be programmed and stored in a recording medium that may be recognized by an electronic device.

Hereinafter, the method of generating an image in accordance with an embodiment of the present invention is described with reference to FIGS. 1 to 8.

Referring to FIG. 1, the method of generating an image in accordance with an embodiment of the present invention may include mapping a source image to a sphere at step S11, generating a virtual plane according to the structure of a theater at step S12, projecting the source image on the sphere on the virtual plane at step S13, and generating a projection image using the source image projected on the virtual plane at step S14.

In this case, the theater may be a known theater including only a single projection surface, but preferably may be a multi-projection theater in which a plurality of projection surfaces has been disposed.

Figure 2:
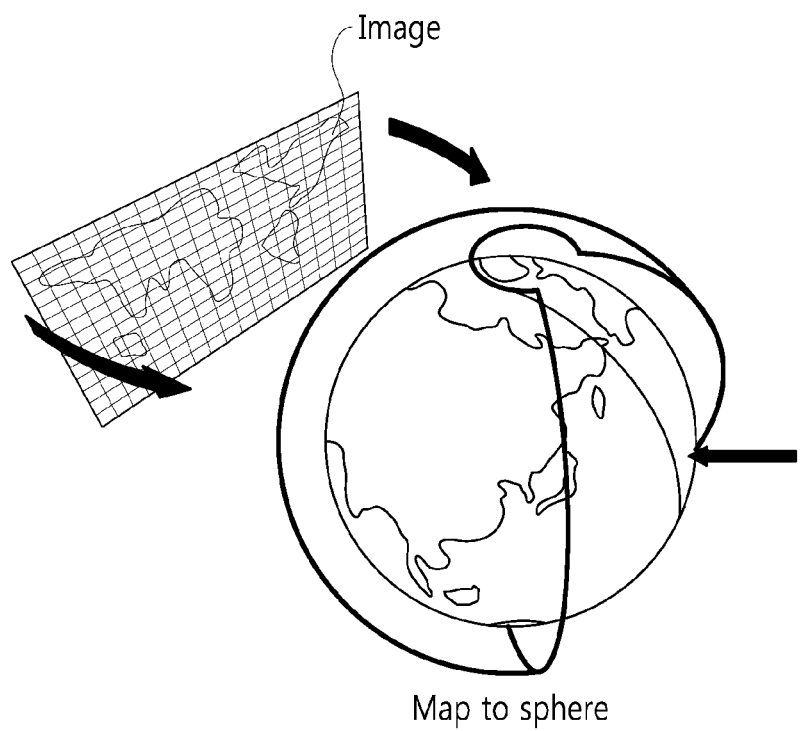
FIG. 2 is an exemplary diagram illustrating that a source image is mapped to a sphere.

At step S11, the source image for generating projection images for the theater is mapped to the sphere. More specifically, as illustrated in FIG. 2, the source image is changed into an image on a 3D space by mapping the source image to the sphere.

The source image is a basis image for generating projection images for the theater. The source image may include various images, such as movie content and advertisement content.

Figure 3:
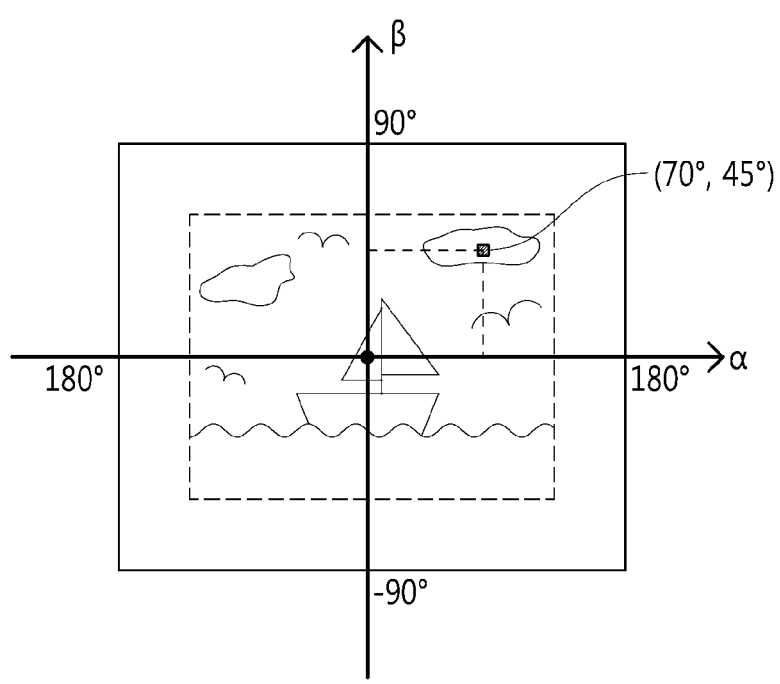
FIG. 3 is an exemplary diagram illustrating an example of a source image represented on a coordinate system using a horizontal angle value and a vertical angle value as parameters.
Figure 4:
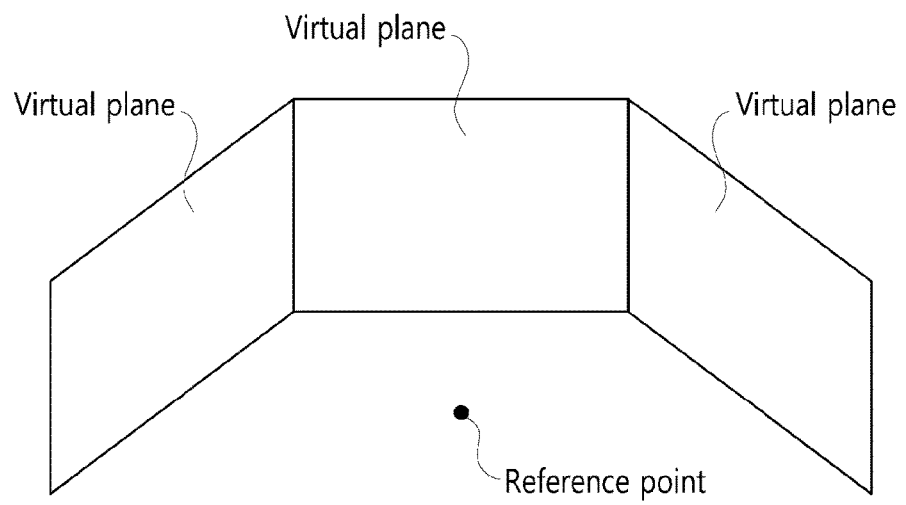
FIG. 4 is an exemplary diagram illustrating an example of virtual planes configured in a form corresponding to the structure of a theater (i.e., the structure of a projection surface)
Figure 4:
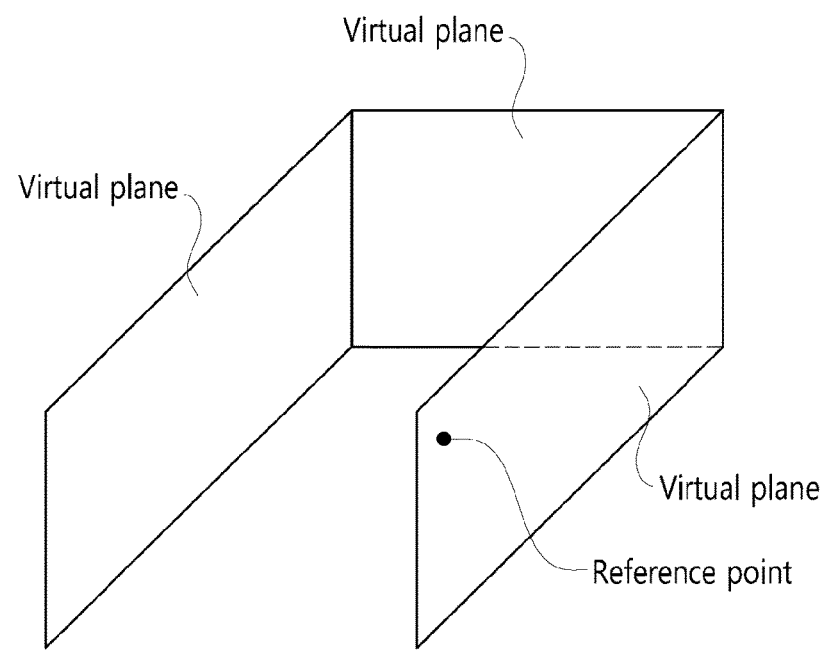

Furthermore, the source image may be represented in a coordinate system that uses a horizontal angle value and a vertical angle value as parameters. For example, as illustrated in FIG. 3, the source image may be formed of pixels in a form in which each of the pixels is represented on a coordinate system in which a horizontal angle value α is a first parameter and a vertical angle value β is a second parameter. In this case, the source image may be easily mapped to on the sphere. In such a case, the pixel may have the horizontal angle value α that belongs to a range of −180 degrees to 180 degrees and have the vertical angle value β that belongs to a range of −90 degrees to 90 degrees. Furthermore, each of the pixels included in the source image preferably is mapped to a location corresponding to its own horizontal angle value α and vertical angle value β around the center of the sphere. For example, a pixel placed at a location of (e.g., 70 degrees, 45 degrees) of the source image may be mapped to a location that has been moved +70 degrees in a horizontal direction (longitude) and moved +45 degrees in a vertical direction (latitude) around the center of the sphere after a reference pixel (0, 0) is mapped. A pixel placed at a location of (−30 degrees, 20 degrees) of the source image may be mapped to a location that has been moved −30 degrees in the horizontal direction and moved +20 degrees in the vertical direction around the center of the sphere.

The sphere may have various sizes, but needs to have a size enough to cover at least all the virtual planes to be described later. More specifically, the sphere needs to have a size that may accommodate all the virtual planes in the state in which the center of the sphere has been matched with a reference point to be described later. The reason for this is that the source image on the sphere can be subject to perspective projection on each of the virtual planes.

At step S12, a virtual plane corresponding to the structure of a theater on which a projection image will be generated is generated. More specifically, at step S12, a virtual plane into which the structural characteristics of a projection surface disposed in the theater has been incorporated is generated based on the structural characteristics of the projection surface.

Accordingly, the number of virtual planes that is the same as the number of projection surfaces disposed in the theater may be generated at step S12. For example, if the theater is a multi-projection top theater including three projection surfaces at the front, on the left side, and on the right side, three virtual planes corresponding to the respective projection surfaces may be generated. If the theater is the multi-projection theater including five projection surfaces at the front, on the left side, on the right side, and at the top and bottom, five virtual planes corresponding to the respective projection surfaces may be generated.

Furthermore, at step S12, a relative location relationship between a plurality of the projection surfaces disposed in the theater may be incorporated into a plurality of the virtual planes without change. For example, if the theater includes three projection surfaces at the front, on the left side, and on the right side and the projection surfaces are disposed in a form that forms an obtuse angle, virtual planes, such as those on the upper side of FIG. 4, may be generated. For another example, if the theater includes three projection surfaces at the front, on the left side, and on the right side and the projection surfaces are disposed in a form that forms a right angle, virtual planes, such as those on the lower side of FIG. 4, may be generated.

The virtual planes preferably are generated on the basis of a reference point that corresponds to a specific location within the theater. More specifically, the virtual planes preferably are generated by taking into consideration a relative location relationship for the reference point. In this case, the reference point may be variously set as a point that may represent the locations of stands disposed in the theater. For example, the reference point may be set as a point in the middle of the stands, a point that is spaced apart from the center of a projection surface disposed at the front of the stands by a specific horizontal distance, or a point set based on the structural surface of the theater (e.g., assuming that the distance between the surface of a wall at the front and the surface of a wall at the back is X, the distance between the surface of a wall on the left and the surface of a wall on the right is Y, and the distance between the bottom and the ceiling is Z, a point that is 0.3*X from the front, 0.5*Y from the surface of the wall on the left, and 0.3*Z from the bottom) in various ways.

Furthermore, the virtual plane may be generated in various manners. For example, the virtual plane may be generated based on measured information in the state in which a measurement apparatus for measuring the structure of the theater has been associated, may be generated based on the structural data of the theater that has been databased, or may be generated using various other methods.

At step S13, the source image mapped to the sphere is projected on the virtual plane. More specifically, at step S13, the sphere generated at step S11 and the virtual plane generated at step S12 is disposed in the same space, and the source image mapped to the sphere is projected on the virtual plane.

Figure 5:
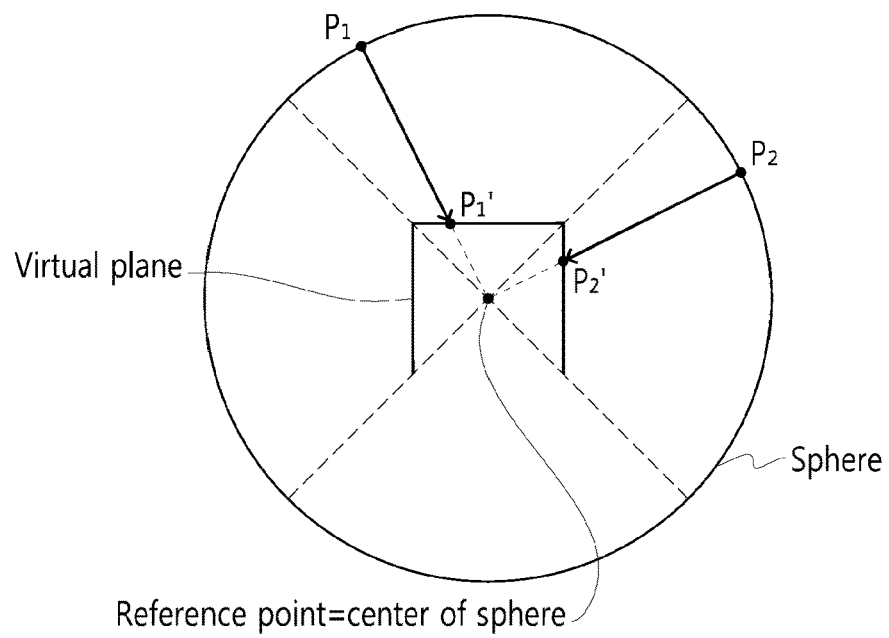
FIG. 5 is an exemplary diagram illustrating that a source image on the sphere is projected on virtual planes.
Figure 5:
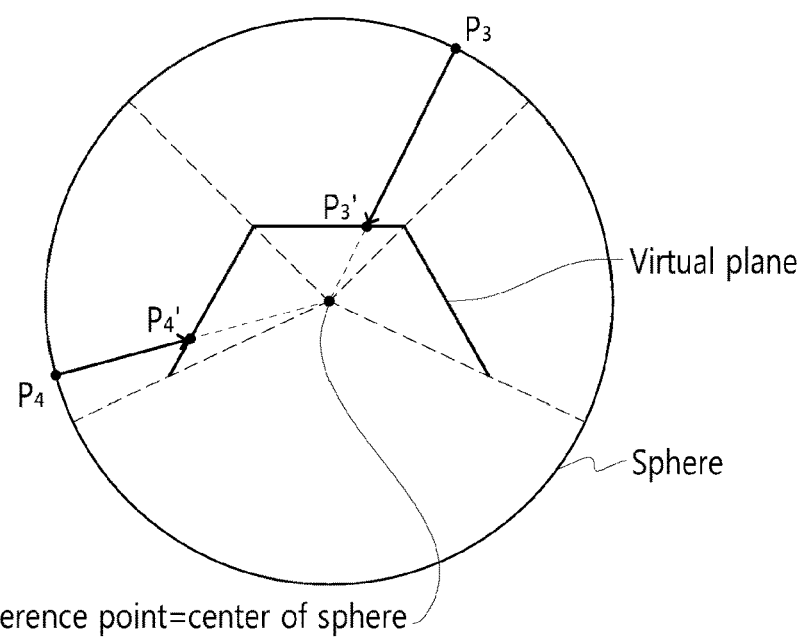

In such a case, the image on the sphere preferably is projected around the center of the sphere through a perspective projection method. For example, as illustrated in FIG. 5, pixels (e.g., P1, P2, P3, and P4) of an image on a sphere are projected as P1', P2', P3', and P4' around the center of the sphere through a perspective projection method. The reason for this is that an image into which perspective has been incorporated through the perspective projection method may be formed on a virtual plane.

Furthermore, the image on the sphere preferably is projected on the virtual planes in the state in which the center of the sphere has been matched with the reference point of the virtual planes. For example, the image may be projected on the virtual planes in the state in which the center of the sphere has been matched with the reference point of the virtual planes, as illustrated in FIG. 5. The reason for this is that an image having maximized perspective may be formed on virtual planes from a viewpoint of stands through projection in such a state.

A location on a virtual plane on which a pixel included in the image on the sphere is projected may be computed in various ways.

1) First, a location on a virtual plane on which a pixel included in the image on the sphere is projected may be computed based on information about the 3D location of the pixel for the center of the sphere.

Figure 6:
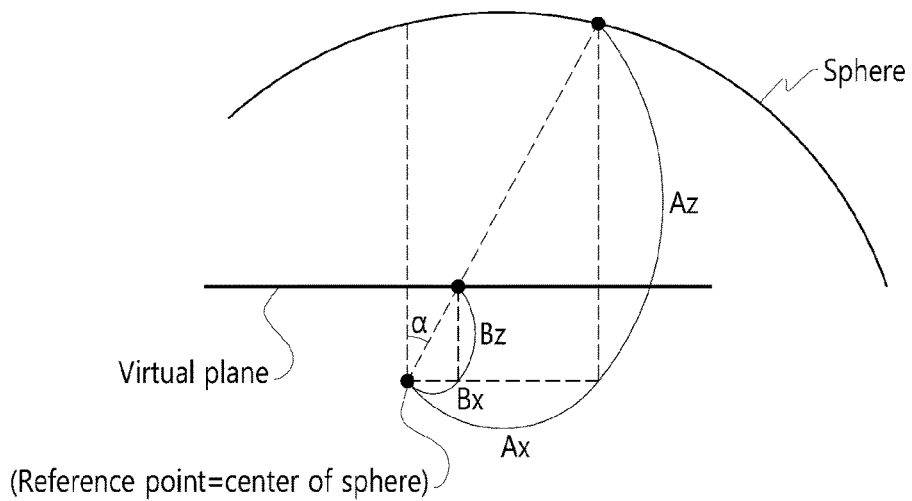
FIGS. 6 to 8 are exemplary diagrams illustrating an example of a process of calculating the location of a pixel projected on a virtual plane.

For example, assuming that a specific pixel on a sphere is subject to perspective projection on a virtual plane at the front as illustrated in FIG. 6, a projection location may be computed as follows based on 3D location information Ax, Ay, and Az for the center of the sphere of the specific pixel.

$Ax:Az=Bx:Bz$ $Bx=(Ax/Az)*Bz$ ($Bz$ is constant at all the points on the same virtual plane)

$Ay:Az=By:Bz$ $By=(Ay/Az)*Bz$ ($Bz$ is constant at all the points on the same virtual plane)

If the pieces of information Ax and Ay are computed, a location on the virtual plane at the front on which the specific pixel is subject to perspective projection may be specified.

Figure 7:
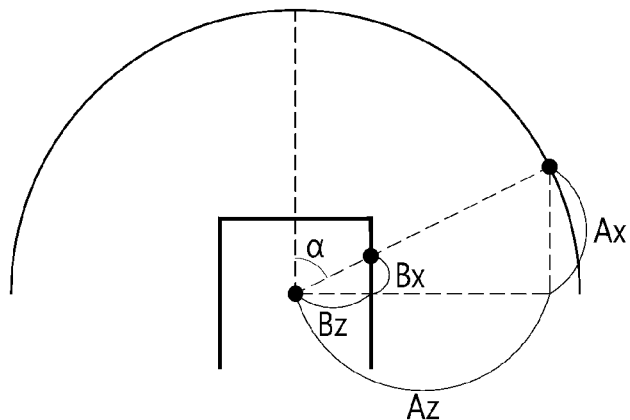
Figure 8:
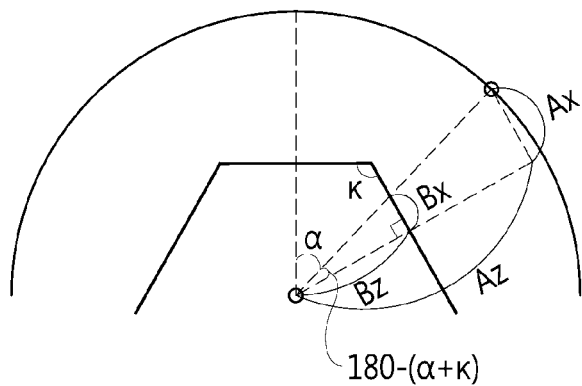

For another example, if a specific pixel on a sphere is subject to perspective projection on a virtual plane on the right side as illustrated in FIGS. 7 and 8, a projection location may be computed as follows based on 3D location information Ax, Ay, and Az for the center of the sphere of the specific pixel.

$Bx=(Ax/Az)*Bz$ ($Bz$ is constant at all the points on the same virtual plane)

$By=(Ay/Az)*Bz$ ($Bz$ is constant in all the points on the same virtual plane)

Furthermore, although not illustrated in detail, if a specific pixel on a sphere is projected on a projection surface on the left side, a projection surface on the ceiling, and a projection surface at the bottom, information about a projection location may be computed using the 3D location information Ax, Ay, and Az in various ways.

2) Next, a location on a virtual plane on which a pixel included in the image on the sphere is projected may be computed based on information about the angle of the pixel for the center of the sphere.

For example, assuming that a specific pixel on a sphere is subject to perspective projection on a virtual plane at the front as illustrated in FIG. 6, a projection location may be computed based on information about the angle (e.g., a horizontal angle value $\alpha$ and a vertical angle value $\beta$) of the specific pixel for the center of the sphere.

$Bx=(Ax/Az)*Bz=(\tan \alpha)*Bz$ $By=(Ay/Az)*Bz=(\tan \beta)*Bz$ ($Bz$ is constant in all the points on the same virtual plane)

Furthermore, if a specific pixel on a sphere is subject to perspective projection on a virtual plane on the right side as illustrated in FIGS. 7 and 8, a projection location may be computed as follows based on information about the angle of the specific pixel for the center of the sphere.

In the example of FIG. 7, $Bx=(Ax/Az)*Bz=(\cot \alpha)*Bz$ $By=(Ay/Az)*Bz=(\tan \beta)*Bz$ ($Bz$ is constant in all the points on the same virtual plane)

In the example of FIG. 8, $Bx=(Ax/Az)*Bz=(\tan(180-(\alpha+k)))*Bz$ $By=(Ay/Az)*Bz=(\tan \beta)*Bz$ ($Bz$ is constant in all the points on the same virtual plane)

Furthermore, although not illustrated in detail, if a specific pixel on a sphere is projected on a projection surface on the left side, a projection surface on the ceiling, and a projection surface at the bottom, information about a projection location may be computed using angle information in various ways.

At step S14, projection images for the theater are generated based on the image projected on the virtual planes. More specifically, at step S14, projection images to be actually played back on projection surfaces corresponding to the virtual planes are generated based on the image projected on the virtual planes at step S13.

For example, assuming that a theater is the multi-projection theater including a projection surface at the front, a projection surface on the left side, and a projection surface on the right side, 1) an image to be projected on the projection surface at the front may be generated based on an image projected on a virtual plane that corresponds to the projection surface at the front, 2) an image to be projected on the projection surface on the left side may be generated based on an image projected on a virtual plane that corresponds to the projection surface on the left side, and 3) an image to be projected on the projection surface on the right side may be generated based on an image projected on a virtual plane that corresponds to the projection surface on the right side.

Furthermore, assuming that a theater is the multi-projection theater including projection surfaces 1 to 6, images to be projected on the projection surfaces 1 to 6 may be generated based on images projected on virtual planes 1 to 6 corresponding to the projection surfaces 1 to 6.

In an embodiment of the present invention, projection images for a plurality of theaters may be generally generated based on the method of generating an image.

More specifically, after a single source image is mapped to a sphere at step S11, projection images for a plurality of theaters may be generally generated through step S12 to step S14 performed on each of the theaters. For example, if "CJ advertisement content", that is, a source image, is to be screened in a theater A, a theater B, and a theater C, after step S11 is performed on the "CJ advertisement content", 1) a projection image for the theater A may be generated by performing step S12 to step S14 on the theater A, 2) a projection image for the theater B may be generated by performing step S12 to step S14 on the theater B, and 3) a projection image for the theater C may be generated by performing step S12 to step S14 on the theater C.

Accordingly, a one-source multi-distribution screening system can be constructed through such a process.

An image management apparatus 100 in accordance with an embodiment of the present invention is described below with reference to FIGS. 9 and 10.

The image management apparatus 100 in accordance with an embodiment of the present invention is an apparatus for managing image information for a theater using the aforementioned method of generating an image. Accordingly, the characteristics described above with respect to the method of generating an image may be analogized and applied to the image management apparatus 100 in accordance with an embodiment of the present invention although they are not described in detail in order to avoid redundancy.

Figure 9:
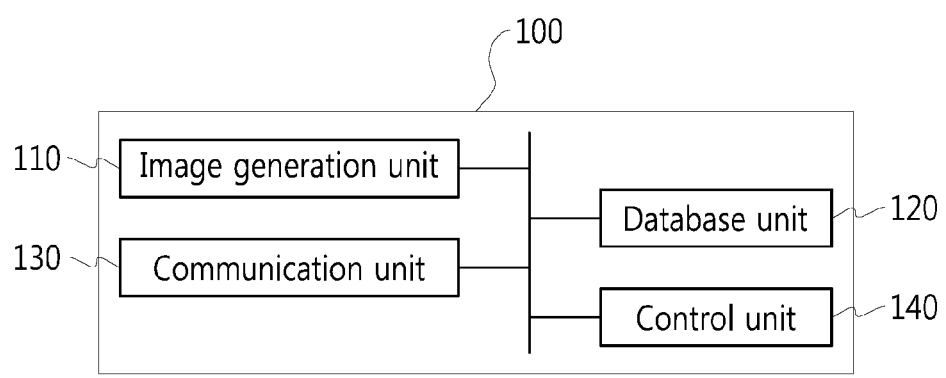
FIG. 9 is a diagram illustrating the configuration of an image management apparatus in accordance with an embodiment of the present invention.

Referring to FIG. 9, the image management apparatus 100 in accordance with an embodiment of the present invention may include an image generation unit 110 configured to map a source image to a sphere, generate virtual planes according to the structure of a theater, and generate images by projecting the source image on the sphere on the virtual planes, a database unit 120 configured to store various data related to the operations of the image management apparatus 100, a communication unit 130 configured to send or receive data to or from the outside, and a control unit 140 configured to control the operations of the elements of the image management apparatus 100.

The image management apparatus 100 may further include a user interface unit configured to receive or transfer information from or to a user.

The image generation unit 110 functions to generate projection images for a theater using the aforementioned method of generating an image.

For example, the image generation unit 110 performs operations for mapping a source image to a sphere based on structural data stored in the database unit 120 or information received through the communication unit 130, generating a virtual plane according to the structure of a theater, and generating a projection image for the theater by projecting the image on the sphere to the virtual plane.

Furthermore, the image generation unit 110 may map a source image, represented on a coordinate system using a horizontal angle value and a vertical angle value as parameters, to the sphere. In this case, the horizontal angle value preferably may be a value that belongs to a range of −180 degrees to 180 degrees, and the vertical angle value preferably may be a value that belongs to a range of −90 degrees to 90 degrees.

Furthermore, the image generation unit 110 may generate the virtual plane so that the structural characteristics of the theater are incorporated into the virtual plane. In such a case, the image generation unit 110 may generate the virtual plane on the basis of the reference point of the theater. Furthermore, the image generation unit 110 may generate a plurality of virtual planes corresponding to a plurality of projection surfaces if the theater is the multi-projection theater.

Furthermore, the image generation unit 110 may project the source image, mapped to the sphere, on the virtual plane in the state in which the reference point of the theater has been matched with the center of the sphere and may generate a projection image for the theater based on such an operation. In such a case, the image generation unit 110 may compute a projection location based on information about the 3D locations or angles of pixels for the center of the sphere. Furthermore, if the theater is the multi-projection theater, the image generation unit 110 may project the image on the sphere on a plurality of virtual planes and may generate projection images to be projected on a plurality of projection surfaces based on a plurality of such projection operations.

Furthermore, the image generation unit 110 may generally generate projection images for a plurality of theaters and send the generated images to the respective theaters using the communication unit 130.

Although not described in detail in order to avoid redundancy, the image generation unit 110 may perform various operations related to the method of generating an image.

The database unit 120 is configured to include one or more memory devices and to store various data related to the operations of the image management apparatus 100. For example, the database unit 120 may store various data, such as the structural data of a theater, a source image, generated sphere data, generated virtual plane data, projection information data, and generated projection image data.

If the image generation unit 110 generally generates projection images for a plurality of theaters, the database unit 120 may sort and store pieces of information corresponding to the respective theaters. For example, the database unit 120 may mark the structural data, virtual plane data, projection information data, and projection image data of a theater A with the identification symbol of the theater A and store them. For another example, the database unit 120 may mark the structural data, virtual plane data, projection information data, and projection image data of a theater B with the identification symbol of the theater B and store them.

The communication unit 130 functions to send or receive a variety of pieces of information over a wired or wireless communication network. The communication unit 130 may include a variety of types of wired communication modules or wireless communication modules or may be implemented simply using a cable.

The communication unit 130 may send or receive a variety of pieces of information related to the operations of the image management apparatus 100. For example, the communication unit 130 may receive the structural data of a theater from a measurement apparatus or server apparatus installed at the theater and store the received structural data in the database unit 120. Furthermore, the communication unit 130 may send and receive data to and from various user terminals (e.g., a PC, a tablet, a mobile, and a laptop computer) and perform such reception and transmission operations under the control of the control unit 140. Furthermore, the communication unit 130 may be connected to the screening systems (e.g., server apparatuses) of various theaters over a communication network and may transfer (or distribute) projection images, generated by the image generation unit 110, over a communication network connected thereto.

The user interface unit is an element configured to receive information from a user or output information to a user. The user interface unit may be implemented in the form of a separate input device (e.g., a keypad, a touch pad, a keyboard, or a mouse) or in the form of a separate output device (e.g., a display or a speaker device), may be implemented in the form of a Graphic User Interface (GUI) on a user terminal connected thereto over a communication network, or may be implemented in various other forms.

A source image may be selected or a theater for which a projection image will be generated may be selected through such a user interface unit. A sphere, a virtual plane, and a projection operation that are used in a process of generating a projection image may be output through the user interface unit. In addition to such operations, a variety of pieces of information for the operations of the image management apparatus 100 and a variety of pieces of information may be output through the user interface unit.

The control unit 140 controls various operations of the image management apparatus 100 which includes the image generation unit 110, the database unit 120, the communication unit 130, and the user interface unit.

The control unit 140 may include at least one operation element. In this case, the operation element may be a general-purpose Central Processing Unit (CPU), but may be a programmable device (e.g., a Complex Programmable Logic Device (CPLD) or a Field Programmable Gate Array (FPGA)), an Application-Specific Integrated Circuit (ASIC), or a microchip controller that is implemented for a special purpose.

Each of the aforementioned constituent elements may be implemented purely using a hardware or software element or may be implemented through a combination of a variety of types of hardware and software. Furthermore, the constituent elements have been illustrated as being separated for convenience of description, but one or more of the constituent elements may be implemented using the same hardware or software.

Figure 10:
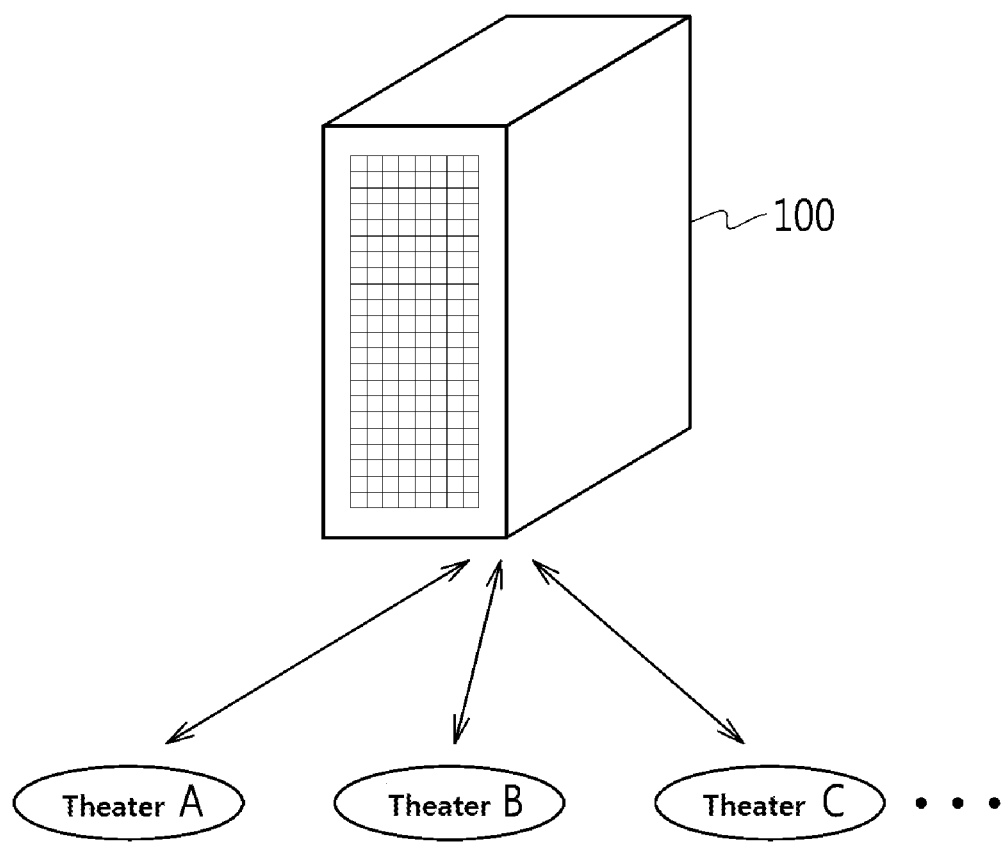
FIG. 10 is an exemplary diagram illustrating that the image management apparatus in accordance with an embodiment of the present invention operates in conjunction with a plurality of theaters.

As illustrated in FIG. 10, the image management apparatus 100 in accordance with an embodiment of the present invention may operate in conjunction with a plurality of theaters, may generally generate projection images for the plurality of theaters, and may distribute the projection images to the respective theaters.

More specifically, the image management apparatus 100 may map a single source image to a sphere, may project the source image on virtual planes for respective theaters, and thus may generally generate projection images for a plurality of the theaters. For example, if "CJ advertisement content", that is, a source image, is to be screened in a theater A, a theater B, and a theater C, after the "CJ advertisement content" is mapped to a sphere, 1) a projection image for the theater A may be generated based on a virtual plane for the theater A, 2) a projection image for the theater B may be generated based on a virtual plane for the theater B, and 3) a projection image for the theater C may be generated based on a virtual plane for the theater C. Furthermore, the image management apparatus 100 may distribute the generated projection images to the respective theaters.

Accordingly, a one-source multi-distribution screening system may be constructed through such a process.

In an embodiment of the present invention, a projection image optimized for the structure of a theater can be generated. More specifically, in accordance with an embodiment of the present invention, a source image is mapped to a sphere, a virtual plane is generated by taking the structure of a theater into consideration, and a projection image is generated by projecting the source image on the sphere on the virtual plane. Accordingly, a projection image optimized for the structure of a theater can be generated.

Furthermore, in an embodiment of the present invention, a projection image can be generated by taking into consideration perspective occurring at the reference point of a theater. More specifically, in accordance with an embodiment of the present invention, a projection image into which perspective has been incorporated can be generated because it is generated through perspective projection in the state in which a reference point, that is, the center of a sphere, has been matched with the center to which a source image has been mapped in a process of generating a virtual plane.

Furthermore, in an embodiment of the present invention, projection images of a plurality of theaters can be generally generated based on a single source image (i.e., a standard image). More specifically, in accordance with an embodiment of the present invention, projection images for a plurality of theaters can be generally generated by mapping a single source image to a sphere and projecting the source image (i.e., a single source), mapped to the sphere, on virtual planes corresponding to the respective theaters. Furthermore, the projection images that have been generally generated can be transferred to the respective theaters, and thus a one-source multi-distribution image management system can be constructed.

Effects of the present invention are not limited to the aforementioned effects and may include various effects within a range that is evident to those skilled in the art to which the present invention pertains from the following description.

The aforementioned embodiments of the present invention have been disclosed for illustrative purposes, but the present invention is not restricted by the embodiments. Furthermore, those skilled in the art to which the present invention pertains may modify and change the present invention in various ways within the spirit and scope of the present invention, and such modifications and changes should be construed as falling within the scope of the present invention.

What is claimed is:

1. A method of generating an image, the method performed by an image management apparatus having a controller, a communication unit, an image generation unit, and a database unit, the method comprising:

mapping, by the image generation unit, a source image to a sphere;

generating, by the image generation unit, a plurality of virtual planes according to a structure of a theater, the theater comprising a plurality of projection surfaces;

projecting, by the image generation unit, the mapped source image on the plurality of the virtual planes;

generating, by the image generation unit, a plurality of projection images to be projected on the plurality of the projection surfaces based on the projected mapped image on the plurality of the virtual planes; and sending, by the controller, the plurality of projection images to the theater through the communication unit, wherein the plurality of the virtual planes is generated based on a structural data of the theater stored in the database unit, wherein the source image comprises a plurality of pixels represented on a planar coordinate system using a horizontal angle value and a vertical angle value as parameters, and wherein each pixel of the plurality of pixels is mapped to a location corresponding to its horizontal angle value and vertical angle value around a center of the sphere.

2. The method of claim 1, wherein the each pixel comprises the horizontal angle value belonging to a range of −180 degrees to 180 degrees and the vertical angle value belonging to a range of −90 degrees to 90 degrees.

3. The method of claim 1, wherein
the plurality of the virtual planes is generated based on a reference point of the theater, and
when the reference point of the theater is matched with the center of the sphere, the mapped source image is projected on the plurality of the virtual planes.

4. The method of claim 1, wherein the projecting the mapped image comprises:
calculating, for a pixel in the mapped source image, a location of the pixel on the plurality of the virtual planes based on 3D location information of the pixel from the center of the sphere or angle of the pixel from the center of the sphere; and
projecting the pixel on the calculated location of the plurality of the virtual planes.

5. A non-transitory computer readable recording medium recording a computer program for causing a computer to execute a method for generating an image, the computer having a controller, a communication unit, an image generation unit, and a database unit, the method comprising:
mapping, by the image generation unit, a source image to a sphere;
generating, by the image generation unit, a plurality of virtual planes according to a structure of a theater, the theater comprising a plurality of projection surfaces;
projecting, by the image generation unit, the mapped source image on the plurality of the virtual planes;
generating, by the image generation unit, a plurality of projection images to be projected on the plurality of the projection surfaces based on the projected mapped image on the plurality of the virtual planes; and
sending, by the controller, the plurality of projection images to the theater through the communication unit,
wherein the plurality of the virtual planes is generated based on a structural data of the theater stored in the database unit,
wherein the source image comprises a plurality of pixels represented on a planar coordinate system using a horizontal angle value and a vertical angle value as parameters, and wherein each pixel of the plurality of pixels is mapped to a location corresponding to its horizontal angle value and vertical angle value around a center of the sphere.

6. An image management apparatus for managing an image to be projected on a theater, comprising:
an image generation unit configured to
map a source image to a sphere,
generate a plurality of virtual planes according to a structure of a theater comprising a plurality of projection surfaces, and
generate a plurality of projection images to be projected on the plurality of the projection surfaces by projecting the mapped source image on the plurality of the virtual planes,
wherein the plurality of the virtual planes is generated based on a structural data of the theater,
wherein the source image comprises a plurality of pixels represented on a planar coordinate system using a horizontal angle value and a vertical angle value as parameters, and
wherein each pixel of the plurality of pixels is mapped to a location corresponding to its horizontal angle value and vertical angle value around a center of the sphere.

7. The image management apparatus of claim 6, wherein the image generation unit is configured to
generate the plurality of the virtual planes based on a reference point of the theater and
when the reference point of the theater is matched with the center of the sphere, project the mapped source image on the plurality of the virtual planes.

8. The image management apparatus of claim 6, wherein the image generation unit is configured to
calculate, for a pixel in the mapped source image, a location of the pixel on the plurality of the virtual planes based on 3D location information of the pixel from the center of the sphere or angle of the pixel from the center of the sphere, and
project the pixel on the calculated location of the plurality of the virtual planes.

9. The image management apparatus of claim 6, further comprising:
a database unit configured to store the structural data of the theater.

10. The image management apparatus of claim 6, further comprising:
a communication unit configured to send data to a plurality of theaters,
wherein the image generation unit is configured to
generate each plurality of virtual planes for each of the plurality of the theaters,
generate each plurality of images to be projected on the each of the plurality of the theaters, and
send the generated each plurality of images to the each of the plurality of the theaters using the communication unit.

* * * * *